US009039158B2

(12) United States Patent
Aznoe et al.

(10) Patent No.: US 9,039,158 B2
(45) Date of Patent: May 26, 2015

(54) INK STICK IDENTIFICATION SYSTEM

(71) Applicant: Xerox Corporation, Norwalk, CT (US)

(72) Inventors: Brian W. Aznoe, Sherwood, OR (US); Brent R. Jones, King City, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/917,439

(22) Filed: Jun. 13, 2013

(65) Prior Publication Data

US 2014/0368564 A1 Dec. 18, 2014

(51) Int. Cl.
*G01D 11/00* (2006.01)
*B41J 2/175* (2006.01)

(52) U.S. Cl.
CPC .................................. *B41J 2/17593* (2013.01)

(58) Field of Classification Search
USPC ....................................... 347/5, 7, 14, 88, 99
See application file for complete search history.

(56) References Cited

U.S. PATENT DOCUMENTS 6,916,808 B2 * 7/2005 Downham et al. ......... 514/230.5
7,537,326 B2 5/2009 Jones
7,722,149 B2 * 5/2010 Suzuki ............................ 347/19
7,766,449 B2 * 8/2010 Watanabe ....................... 347/29
7,780,284 B2 8/2010 Fairchild et al.
7,857,439 B2 12/2010 Jones et al.
7,971,980 B2 7/2011 Jones et al.
8,052,265 B2 11/2011 Jones
8,079,690 B2 12/2011 Johnson et al.
2010/0039473 A1 * 2/2010 Terada ........................... 347/19
2011/0042460 A1 * 2/2011 Tidrick ......................... 235/454
2011/0249066 A1 * 10/2011 Zocchi et al. ................... 347/88
2011/0310200 A1 * 12/2011 Dixon ............................ 347/88
2013/0088535 A1 * 4/2013 Zocchi et al. ..................... 347/7

* cited by examiner

*Primary Examiner* — Stephen Meier
*Assistant Examiner* — Sharon A Polk
(74) *Attorney, Agent, or Firm* — Maginot Moore & Beck LLP

(57) ABSTRACT

A solid ink stick identification system enables accurate and efficient identification of solid ink sticks in a solid ink imaging device. The solid ink identification system includes an actuator configured to move one of an optical source and an optical sensor between a plurality of predetermined positions. The optical source emits light toward a face of the ink stick, and the optical sensor generates signals corresponding to an amount of reflected light received. A controller identifies features on the solid ink stick based on the signals as the one of the optical source and optical sensor is moved between the plurality of predetermined positions.

20 Claims, 5 Drawing Sheets

INK STICK IDENTIFICATION SYSTEM

TECHNICAL FIELD

This disclosure relates generally to phase change inkjet imaging devices, and, in particular, to systems that identify ink sticks in such imaging devices.

BACKGROUND

Solid ink or phase change ink printers encompass various imaging devices, including copiers and multi-function devices. These printers offer many advantages over other types of image generating devices, such as laser and aqueous inkjet imaging devices. Solid ink or phase change ink printers conventionally receive ink in a solid form as pellets or as ink sticks. A color printer typically uses four colors of ink (cyan, magenta, yellow, and black, also referred to as "CMYK").

The solid ink pellets or ink sticks, hereafter referred to as solid ink, sticks, or ink sticks, are delivered to a melting device, which is typically coupled to an ink loader, for conversion of the solid ink to a liquid. A typical ink loader includes multiple feed channels, one for each color of ink used in the printer. Each feed channel directs the solid ink within the channel toward a melting device located at the end of the channel. Solid ink at a terminal end of a feed channel contacts the melting device and melts to form liquid ink that can be delivered to a printhead. Inkjet ejectors in the printhead are operated using firing signals to eject ink onto a surface of an image receiving member.

In some printers, each feed channel has a separate insertion opening in which ink sticks of a particular color are placed and then are transported by a mechanical conveyor, gravity, or both along the feed channel to the melting device. In other solid ink printers, solid ink sticks of all colors are loaded into a single insertion port, where a mechanical sensor identifies the ink stick by physically contacting identification indicia on the ink sticks. An ink transport system then transports the ink stick to the proper feed channel for the inserted ink stick. Some printers include optical detection systems for ink stick identification. Such printers have multiple optical sources and/or multiple optical sensors fixed in each feed channel to detect identifying features of the ink sticks. However, providing and connecting multiple optical sources and sensors can be expensive and the light and sensor variability can result in errors in identifying features. Thus, improved ink stick identification is desirable.

SUMMARY

An ink stick detection system has been configured to detect identification features in different ink sticks with a single detector. The system includes an optical source oriented to emit light toward a first face of a solid ink stick supported in the imaging device, an optical sensor oriented to receive light reflected from the first face of the solid ink stick and configured to generate signals corresponding to an amount of received reflected light, an actuator operatively connected to one of the optical source and the optical sensor, the actuator being configured to move the one of the optical source and the optical sensor between a plurality of predetermined positions, and a controller operatively connected to the actuator and the optical sensor, the controller being configured to identify a feature of the solid ink stick from the signals generated by the optical sensor.

The system implements a method of identifying an ink stick. The method includes operating an optical source to emit light oriented at a first face of a solid ink stick supported in an imaging device, operating an actuator to move one of the optical source and an optical sensor between a plurality of positions, generating a signal with the optical sensor corresponding to an amount of reflected light received by the optical sensor when the one of the optical source and the optical sensor is at each of the plurality of positions, and identifying a feature of the solid ink stick from the signals generated by the optical sensor at each of the plurality of positions.

DETAILED DESCRIPTION

Figure 1:
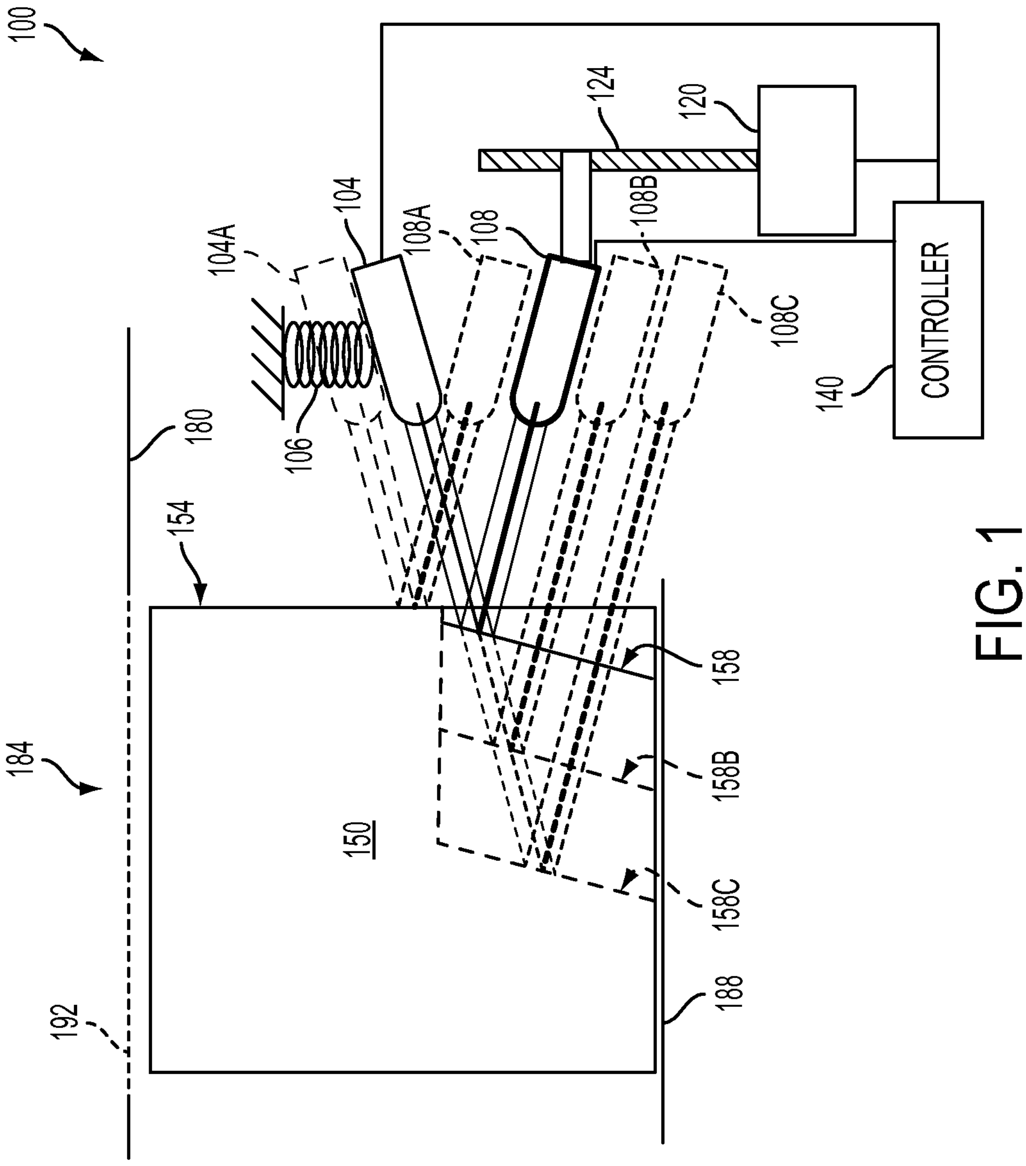
FIG. 1 is a side view of one embodiment of an ink stick identification system having an optical source and an actuator operatively connected to an optical sensor to enable detection of an identifying feature in a surface of an ink stick.

For a general understanding of the present embodiments, reference is made to the drawings. In the drawings, like reference numerals have been used throughout to designate like elements. As used herein, the terms "printer," "printing device," or "imaging device" generally refer to a device that produces an image with one or more colorants on print media and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data may include text, graphics, pictures, and the like. The operation of producing images with colorants on print media, for example, graphics, text, photographs, and the like, is generally referred to herein as printing or marking. Phase-change ink printers use phase-change ink, also referred to as a solid ink, which is in a solid state at room temperature but melts into a liquid state at a higher operating temperature. The liquid ink drops are printed onto an image receiving surface in either a direct printer, which ejects directly onto media, or an indirect printer, also known as an offset transfer printer.

FIG. 1 illustrates a solid ink stick identification system 100 for a solid ink printer 180. The system 100 is positioned in the printer 180 within an ink loader 184, which has an ink stick support 188 and an insertion port 192. A solid ink stick 150 is inserted into the printer 180 through the insertion port 192 and rests on the ink stick support 188. The ink stick 150 includes an identifying feature, for example surface 158, that the ink stick identification system 100 is configured to identify. The solid ink stick 150 of FIG. 1 is not depicted to scale to more clearly show the identifying feature 158.

The ink stick identification system 100 includes an optical source 104, an optical sensor 108, an actuator 120, and a controller 140. The optical source 104 is oriented toward a face 154 of the solid ink stick 150 and is configured to emit light directed at the identifying feature, such as surface 158, of the ink stick 150. In one embodiment, the optical source emits diffuse light and is, for example, a 2 millimeter light-emitting diode (LED). In other embodiments, the optical source is a focused light source, for example a 2 millimeter LED laser. In further embodiments, the optical source can include any suitable size and type of light source. In the illustrated embodiment, the optical source 104 is biased downwardly by a spring 106 to the position of FIG. 1.

The optical sensor 108 is oriented toward the face 154 of the solid ink stick 150 and is configured to receive light reflected from the identifying features of the solid ink stick 150. The optical sensor 108 generates electronic signals corresponding to an amount of light received by the sensor 108. The sensor 108 is also operatively connected to the controller 140 to enable the optical sensor 108 to deliver the electronic signals generated to the controller 140. In one embodiment, the optical sensor is a 2 millimeter phototransistor, though other sizes and types of optical sensors are used in other embodiments.

In the embodiment of FIG. 1, the optical source 104 and the optical sensor 108 are oriented toward the face 154 of the ink stick 150 and, when the stick is inserted into the printer, face 154 is on a side other than the side facing toward the insertion port 192 of the printer 180. Since insertion provision and feed directions relative to the insertion opening may vary based on the ink loader configuration, the ink stick sensing features are oriented appropriately for a particular ink loader. For simplicity in the description presented below, any of the possible sensor feature sides described as being "opposite" the insertion opening means the sensor feature side is a side of the ink stick other than the side facing the insertion port. Positioning the optical source 104 and optical sensor 108 behind the ink stick 150 and above the ink stick support 188 reduces contamination of the optical source 104 and optical sensor 108 from foreign particles and debris. Furthermore, positioning the ink stick identification system 100 behind the ink loader 180 enables a more compact ink loader 180 and identification system 100. However, in different embodiments, the optical source and optical sensor can be positioned at another suitable location proximate to the ink stick. As used herein, "detector" refers to the configuration of the optical source and optical sensor that operate together to detect the sensor feature in the sensor side of the ink stick.

The actuator 120 includes a lead screw drive 124 operatively connected to the optical sensor 108. The actuator 120 operates to move the lead screw drive 124, which moves the optical sensor 108 between a plurality of positions, for example positions 108A, 108B, and 108C. In the illustrated embodiment, the actuator 120 moves the optical sensor 108 vertically, though in other embodiments the actuator can move the optical sensor horizontally, diagonally, in an arcuate path, or in any combination of vertical, horizontal, diagonal, and arcuate paths. The actuator 120 is operatively connected to the controller 140 to enable the controller 140 to operate the actuator 120 to move the optical sensor 108 along a range of motion within travel limits, which is referenced in this document as "the plurality of positions," and the number of positions in this range of motion is not necessarily limited. Although not illustrated, an actuator may move one or more detectors (optical source and optical sensor) simultaneously.

As the optical sensor 108 is moved between the plurality of positions, the optical sensor 108 generates electrical signals corresponding to the amount of light reflected from the solid ink stick 150 and received by the optical sensor 108 at each position. As the optical source 104 generates the light, the magnitude and trajectory of the reflected light remains substantially constant. The light received by the optical sensor 108 therefore fluctuates with reference to the position of the optical sensor 108 and the amount of reflected light received at each position. The optical sensor 108 generates a signal corresponding to the maximum amount of received light at the position in which the optical sensor 108 receives the most direct reflection of the light from the feature 158 of the ink stick 150. The controller 140 identifies the feature 158 of the solid ink stick 150 based on the position of the actuator 120, and therefore the optical sensor 108, when the signal corresponding to the maximum received light is generated.

The face 154 of the ink stick 150 includes the angled identifying surface 158. In some embodiments, the angled surface 158 is located in an inset portion of the ink stick 150 that only extends across a portion of the face 154 of the ink stick. In other embodiments, the angled surface 158 extends across the entire width of the ink stick face. The angled surface 158 is configured to reflect light emitted by the optical source 104 in the direction of the optical sensor 108. As shown in FIG. 1, the ink stick 150 can be configured with the angled surface at a variety of different depths in the face 154 of the ink stick, for example 158A and 158B, such that light emitted from the optical source 108 reflects primarily to a different location for ink sticks having the angled surface positioned at different locations. In the embodiment of FIG. 1, the surface 158 is angled approximately 15 degrees to vertical. In other embodiments, the ink stick can have a feature surface positioned at a different vertical angle, a feature surface that is angled horizontally, or a curved feature surface, so long as the ink stick features reflect light toward a portion of the path of the optical sensor.

Operation and control of the various subsystems, components and functions of the ink loader are performed with the aid of the controller 140. The controller 140 can be implemented with general or specialized programmable processors that execute programmed instructions. The instructions and data required to perform the programmed functions are stored in memory associated with the processors. The processors, their memories, and interface circuitry configure the controller 140 to perform the functions described above and the processes described below as the processors execute the programmed instructions stored in the memories and operate the electronic components connected to the processors through the interface circuitry. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

In operation, a user inserts a solid ink stick 150 into the ink loader 184 through the insertion port 192 to rest on the ink stick support 188. In the embodiment depicted in FIG. 1, the optical sensor 108 is configured to rest in position 108A, and the optical sensor 108 contacts the optical source 104 to retain the optical source 104 against the force of spring 106 in position 104A. In position 104A, the optical source 104 emits light that reflects off surface 154 toward the optical sensor 108 in position 108A. When an ink stick 150 is present in the ink loader 184, the light emitted by the optical source 104 in position 104A reflects to the optical sensor 108 in position 108A, and the sensor 108 generates an electronic signal that is delivered to the controller 140 indicating that the ink stick 150 is present in the ink loader 184. In other embodiments, the ink loader can include a separate detector that signals to the controller the presence of an ink stick in the ink loader. Differentiating between the ink loader state prior to and just after an ink stick is inserted may not need a high signal strength, as from a direct reflection into the optical detector, so a simplified configuration of the "stationary" optical detector where no motion occurs is envisioned for desirable cost containment. An alternative intended to ensure high insertion detection signal strength is depicted in FIG. 1 and described below. The optical light source may be cycled on or pulsed when the access door or cover to the ink loader is lifted, so as to detect when an ink stick is inserted or in printers having multiple feed channels, in which channel the ink stick has been inserted.

Once the ink stick 150 is positioned in the ink loader 184, the controller 140 operates the optical source 104 to emit light at the surface 154 of the ink stick 150. As the optical source 104 emits light at surface 154, the controller 140 operates the actuator 120 to move the optical sensor 108 between the plurality of positions 108A-C. In FIG. 1, the optical source 104 is biased downwardly by the spring 106, and as the optical sensor 108 moves downwardly from position 108A, the optical source 104 moves to and remains in the position shown in FIG. 1. The optical sensor 108 continues to move downwardly to the position of FIG. 1 and then to positions 108B and 108C as the sensor 108 generates electronic signals corresponding to the amount of reflected light received by the sensor 108 at the different positions. In one embodiment, the optical sensor generates the signals only at the predetermined positions, while in other embodiments the optical sensor is configured to generate electronic signals substantially continuously as the optical sensor is moved.

As shown in FIG. 1, the ink stick 150 includes identifying surface 158, such that the light emitted by the optical source 104 reflects toward the optical sensor 108 in the position shown in FIG. 1. The optical sensor 108 therefore generates a signal indicating a peak amount of received light when the sensor 108 is in the position of FIG. 1. As the actuator 120 moves the optical sensor 108 downwardly to positions 108B and 108C, the sensor 108 receives less reflected light, and the signals generated by the sensor 108 are reduced accordingly to indicate the lesser amounts of received light. The controller 140 identifies the peak signal generated by the optical sensor 108, and correlates the peak signal to the position of the optical sensor 108 when the peak signal is generated. The controller 140 then identifies, based on the position of the optical sensor 108 at which the peak signal is generated, that the solid ink stick 150 includes feature surface 158. The actuator 120 can be a stepper motor so sensor position can be correlated to motor counts. Determining positions in a motion mechanism is a well-known process and can be accomplished with a variety of well-known methods not described herein.

Other ink sticks can include identifying surfaces 158B or 158C in place of surface 158 to indicate different properties of the solid ink sticks. An ink stick having identifying surface 158B reflects light primarily to position 108B, such that the optical sensor 108 generates the signal corresponding to the peak amount of light received when in position 108B. Likewise, an ink stick having identifying surface 158C reflects light primarily toward position 108C, and the optical sensor 108 generates the signal corresponding to the peak amount of light received when in position 108C. Consequently, the structure that enables the optical sensor 108 to move enables the ink stick identification system 180 to identify ink sticks having different identifying features at a single insertion port.

Although three identifying surfaces are illustrated in the embodiment of FIG. 1, the reader should appreciate that the ink stick identification system can be utilized in a printer configured to accept ink sticks having identification surfaces in other positions or orientations. The ink stick identification system can be configured to move the optical sensor to any suitable number of predetermined positions to identify feature surfaces in other positions or orientations. Additionally, since the actuator moves the optical sensor, the ink stick identification system 100 is versatile for use in different printer models to identify features defined on ink sticks having different shapes and sizes. Some printers can include multiple identification systems installed in a single ink loader to enable identification of a larger number of features on an ink stick.

The ink stick identification system 100 enables improved identification of solid ink sticks 150. Over time, contamination from foreign particles and normal wear can result in an optical source generating a light having lower intensity than light from a newer optical source. Further, contamination and general sensor variability can affect the magnitude of the signal generated by optical sensor. Some systems, for example those systems having multiple optical sources or optical sensors, identify ink sticks by identifying a sensor signal having an amplitude greater than a threshold value. However, the variability of optical sources and sensors can result in the sensor failing to generate a signal greater than the threshold, and therefore failing to identify an ink stick. The solid ink stick identification system 180 is configured to identify the ink stick from the peak amplitude generated by the single optical source 104 and optical sensor 108 pair. The peak signal is always generated by the optical sensor 108 at the position where the light most directly reflects off the ink stick 150 toward the sensor 108, regardless of the contamination or variability of the optical source 104 and optical sensor 108 in the system 180.

The ink sticks identified by the ink stick identification system 180 can be manufactured simply and economically. The ink sticks can be produced with different feature surfaces 158, 158B, and 158C simply by moving a tool slide in an ink stick mold used to produce the ink sticks to a different position during the ink stick fabrication process.

Some printers include a separate ink loader for each color of ink stick utilized by the printer. Such printers can include a separate ink stick identification system for each ink loader. Other printers include an optical source and sensor for each ink loader, and the optical sensors are operatively connected to a single actuator that moves all of the optical sensors when an ink stick is inserted in any one of the ink loaders.

Figure 2:
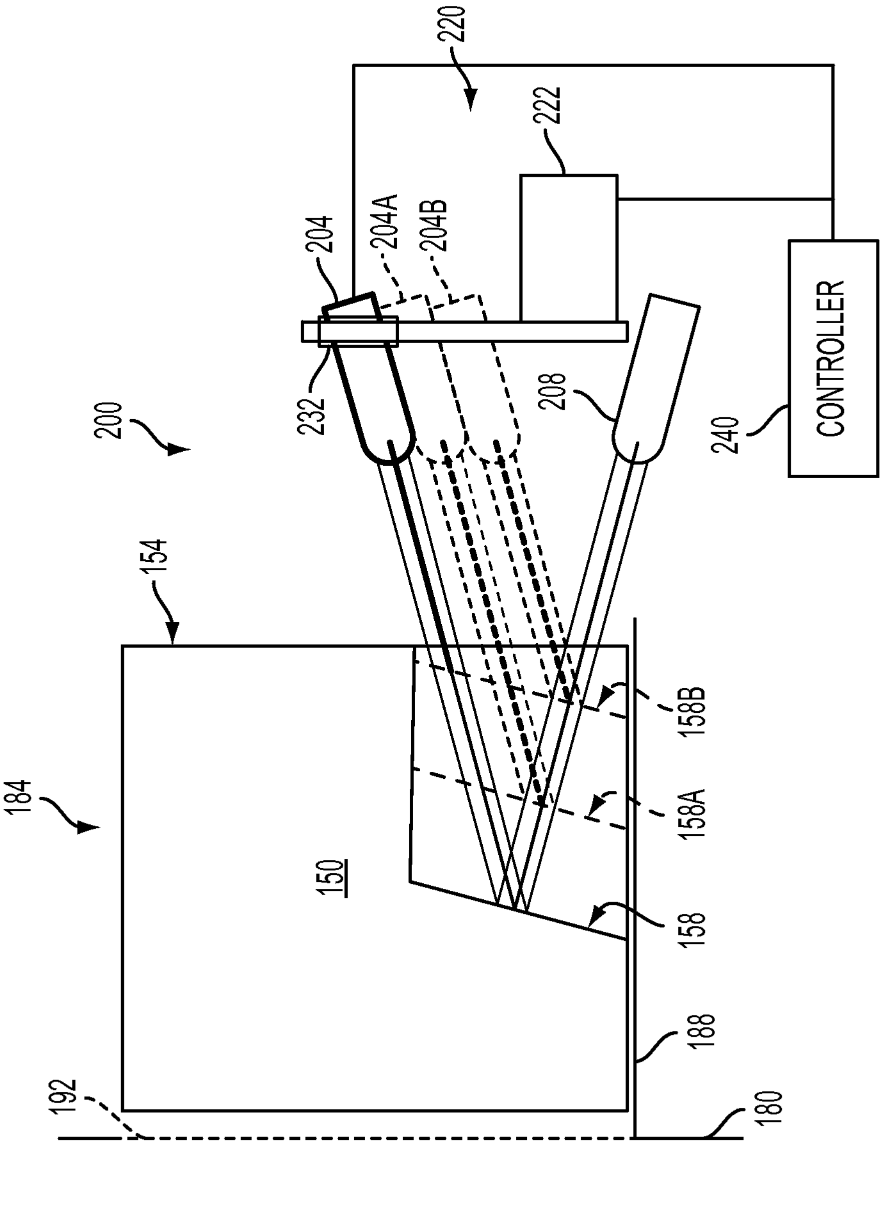
FIG. 2 is a side view of another embodiment of an ink stick identification system having an optical sensor and an actuator operatively connected to an optical source to enable detection of an identifying feature in a surface of an ink stick.

FIG. 2 illustrates another solid ink stick identification system 200 for a solid ink printer 180. The system 200 is positioned in the printer 180 within an ink loader 184 and proximate to an ink stick 150, both of which are configured to function optically in a manner similar to the ink loader 184 and ink stick 150 described with reference to FIG. 1, but with the insertion opening being located on a different side of the loader in FIG. 2.

The ink stick identification system 200 includes an optical source 204, an optical sensor 208, an actuator 220, and a controller 240. The optical source 204 is oriented toward the face 154 of the solid ink stick 150 and is configured to emit light directed at the identifying feature, for example surface 158, of the ink stick 150.

The optical sensor 208 is oriented toward the face 154 of the solid ink stick 150 and is configured to receive light reflected from the identifying features of the solid ink stick 150. The optical sensor 208 generates electronic signals corresponding to an amount of light received by the sensor 208. The sensor 208 is also operatively connected to the controller 140 to enable the optical sensor 208 to deliver the generated electronic signals to the controller 140.

Figure 3:
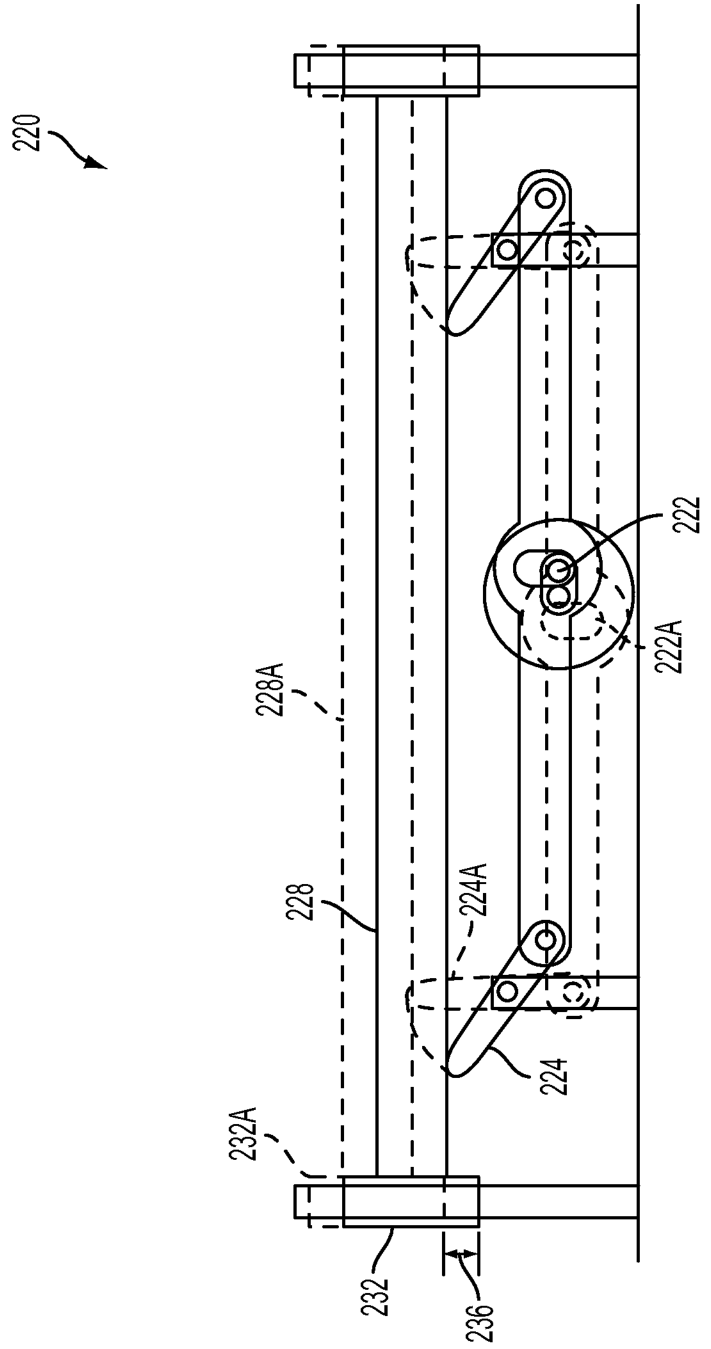
FIG. 3 is a rear view of an eccentric drive actuator of the ink stick identification system of FIG. 2.

The actuator 220 is operatively connected to and configured to move the optical source 204. As shown in FIG. 3, the actuator 220 includes an eccentric drive 222, a pivoting member 224, an elongated member 228, and a mount 232. The eccentric drive 222 operates to move the components of the actuator 220 between the position shown in FIG. 3, which corresponds to position 204B of the optical source 204, and the upper position, wherein the actuator 220 components are in positions 222A, 224A, 228A, and 232A and the optical source 204 is in the position of FIG. 2.

As the optical source 204 is moved between the plurality of positions, the optical sensor 208 generates electrical signals corresponding to the amount of reflected light received from the solid ink stick 150 at each position. The intensity of the reflected light remains substantially constant, while the trajectory of the reflected light varies with the movement of the optical source 204. The light received by the optical sensor 208 is therefore a function of the position of the optical source 204. The optical sensor 208 generates a signal corresponding to the maximum amount of received light when the optical source 204 is at the position in which the light most directly reflects from the feature 158 of the ink stick 150 toward the optical sensor 208. The controller 240 identifies the feature 158 of the solid ink stick 150 based on the position of the actuator 220, and therefore the optical source 204, when the signal corresponding to the maximum received light is generated.

The face 154 of the ink stick 150 includes the angled identifying surface 158, which is configured to reflect light emitted by the optical source 204 in the direction of the optical sensor 208. As shown in FIG. 2, the ink stick 150 can be configured with the angled surface at a variety of different depths in the face 154 of the ink stick, for example 158A and 158B, such that the ink sticks having different feature depths reflect light primarily toward the optical sensor 208 at different positions of the optical source 204.

In operation, a user fully inserts a solid ink stick 150 into the ink loader 184 through the insertion port 192 such that the ink stick 150 rests on the ink stick support 188. The controller 240 receives a signal from a sensor system or other mechanism that detects the presence of an ink stick to indicate to the controller 240 that the ink stick 150 has been inserted into the ink loader 184.

Once the ink stick 150 is positioned in the ink loader 184, the controller 240 operates the optical source 204 to emit light at the surface 154 of the ink stick 150. As the optical source 204 emits light at surface 154, the controller 240 operates the eccentric drive 222. In the position of FIG. 3, the eccentric drive 222 is in the left-most position, resulting in the pivoting members 224 being at an angle relative to vertical. The elongated member 228 is therefore in a lower position, and the attached mount 232 is also in a lower position. The optical source 204 (FIG. 2), which is attached or movably interfaced to the mount 232, is thus also in the lower position 204B. As the eccentric drive 222 moves toward position 222A, the pivoting member 224 moves toward the vertical position 224A, urging the elongated member 228 and mount 232 upwardly toward positions 228A and 232A, respectively. The actuator 220 is configured to move the optical source 204 an overall vertical distance represented by 236 to move the optical source 204 between the plurality of positions shown in FIG. 2. Low cost mechanisms are essential in modern products. In FIG. 2 only one detector is visible, though additional detectors can be positioned directly behind or in front of those shown. The elongated member 228 shown in the example mechanism of FIG. 3 illustrates one possible configuration that simultaneously and efficiently moves multiple detectors across a plurality of ink loader color channels (not shown). In a multiple detector arrangement, the detectors are aligned with color channels and may be positioned with uniform or non-uniform spacing along the width of member 228

As the optical source 204 is moved, the optical sensor 208 generates electronic signals corresponding to the amount of reflected light received by the sensor 208 at the various positions of the optical source 204. As shown in FIG. 2, the ink stick 150 includes identifying surface 158, such that the light emitted by the optical source 204 reflects most directly toward the optical sensor 208 when the optical source 204 is in the position shown in FIG. 2. The optical sensor 208 therefore generates a signal indicating a peak amount of received light when the source 204 is in the position of FIG. 2. As the actuator 220 moves the optical source 204 to positions 204B and 204C, the sensor 208 receives less reflected light, and the signals generated by the sensor 208 indicate the lesser amounts of received light. The controller 240 identifies the peak signal generated by the optical sensor 208, and correlates the peak signal to the position of the optical source 204 when the peak signal is generated. The controller 240 then identifies, based on the position of the optical source 204 when the peak signal is generated, that the solid ink stick 150 includes feature surface 158.

Figure 4:
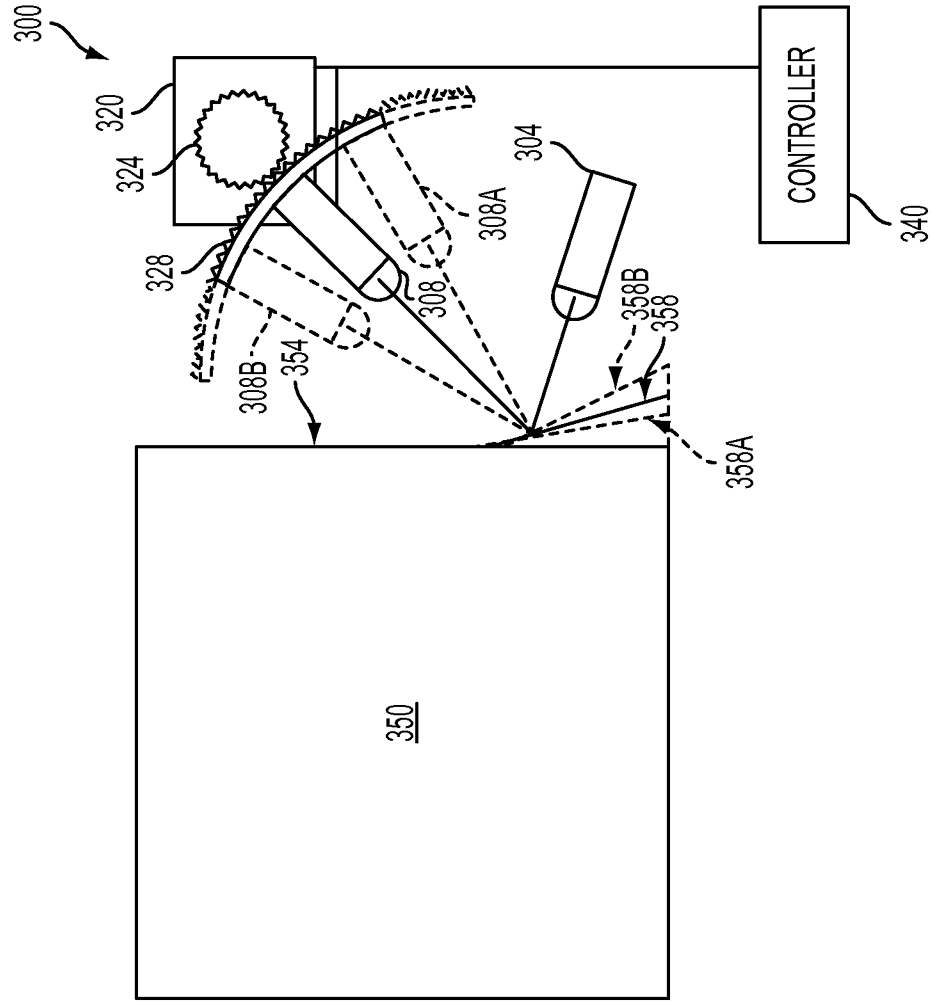
FIG. 4 is a side view of one embodiment of an ink stick identification system having an optical source and a gear drive actuator operatively connected to an optical sensor to move the optical sensor in an arcuate path and enable detection of an identifying feature in a surface of an ink stick.

Another embodiment of a solid ink stick identification system 300 for a solid ink printer is illustrated in FIG. 4. The system 300 is positioned in the printer within an ink loader and oriented toward a face 354 of an ink stick 350 in the ink loader. The face 354 includes an identifying feature, for example surface 358, that the ink stick identification system 300 is configured to identify.

The ink stick identification system 300 includes an optical source 304, an optical sensor 308, an actuator 320, and a controller 340. The optical source 304 is oriented toward the face 354 of the solid ink stick 350 and is configured to emit light directed toward the identifying feature, surface 358, of the ink stick 350.

The optical sensor 308 is oriented toward the face 354 of the solid ink stick 350 and is configured to receive light reflected from the identifying features of the solid ink stick 350. The optical sensor 308 generates electronic signals corresponding to an amount of light received by the sensor 308. The sensor 308 is also operatively connected to the controller 340 to enable the optical sensor 308 to deliver the electronic signals generated to the controller 340.

The actuator 320 includes a pinion gear 324 that meshes with an arcuate rack gear 328 on which the optical sensor 308 is mounted. The actuator 320 operates in response to a control signal generated by controller 340 to turn the pinion gear 324, which moves the rack gear 328 and the optical sensor 308 in an arcuate path between a plurality of positions, for example positions 308A and 308B. The actuator 320 is operatively connected to the controller 340 to enable the controller 340 to operate the actuator 320 to move the optical sensor 308 between the plurality of positions.

As the optical sensor 308 is moved between the plurality of positions, the optical sensor 308 generates electrical signals corresponding to the amount of reflected light received from the solid ink stick 350 at each position. As the optical source 304 generates the light, the magnitude and trajectory of the reflected light remains substantially constant. The light received by the optical sensor 308 therefore fluctuates only due to the position of the optical sensor 308 with respect to the reflected light. The optical sensor 308 generates a signal corresponding to the maximum amount of received light at the position in which the optical sensor 308 receives the most direct reflection of the light from the feature 358 of the ink stick 350. The controller 340 identifies the feature 358 of the solid ink stick 350 based on the position of the actuator 320, and therefore the optical sensor 308, when the signal corresponding to the maximum received light is generated.

The face 354 of the ink stick 350 includes the protruding angled identifying surface 358. The angled surface 358 is configured to reflect light emitted by the optical source 304 in the direction of the optical sensor 308. As shown in FIG. 4, the ink stick 350 can be configured for ink stick differentiation with the angled surface at different angles relative to vertical, as depicted by alternate feature surfaces 358A and 358B, such that light emitted from the optical source 308 reflects primarily to a different location for ink sticks having the feature surfaces at different angles. The angled surface feature can protrude outboard of the general ink stick shape, as shown in FIG. 4, or be inset, or, with respect to the various possible angles, be a combination of protruding or inset features.

In operation, a user inserts a solid ink stick 350 into the ink loader of the printer. A sensor system in the ink loader signals to the controller that an ink stick is present in the ink loader. Once the ink stick 350 is positioned in the ink loader, the controller 340 operates the optical source 304 to emit light at the surface 354 of the ink stick 350. As the optical source 304 emits light at surface 354, the controller 340 operates the actuator 320 to move the optical sensor 308 between the plurality of positions 308A-308B. The optical sensor 308 moves between position 308A, the position of FIG. 4, and position 308B in the arcuate path defined by the curved rack gear 328 as the sensor 308 generates electronic signals corresponding to the amount of reflected light received by the sensor 308 at the positions.

As shown in FIG. 4, the ink stick 350 includes identifying surface 358 to reflect the light emitted by the optical source 304 toward the optical sensor 308 in the position shown in FIG. 4. The optical sensor 308 therefore generates a signal indicating a peak amount of received light when the sensor 308 is in the position of FIG. 4. As the actuator 320 moves the optical sensor 308 between positions 308A and 308B, the sensor 308 receives less reflected light, and the signals generated by the sensor 308 at positions 308A and 308B indicate the lesser amounts of received light. The controller 340 identifies the peak signal generated by the optical sensor 308, and correlates the peak signal to the position of the optical sensor 308 when the peak signal is generated. The controller 340 then identifies, based on the position of the optical sensor 308 where the peak signal is generated, that the solid ink stick 350 includes feature surface 358.

Other ink sticks placed on the ink stick support can include identifying surfaces 358A or 358B in place of surface 358 to indicate different properties of the solid ink sticks. An ink stick having identifying surface 358A reflects light primarily to position 308A, such that the optical sensor 308 generates the signal corresponding to the peak amount of light received when in position 308A. Likewise, an ink stick having identifying surface 358B reflects light primarily toward position 308B, and the optical sensor 308 generates the signal corresponding to the peak amount of light received when in position 308B.

Figure 5:
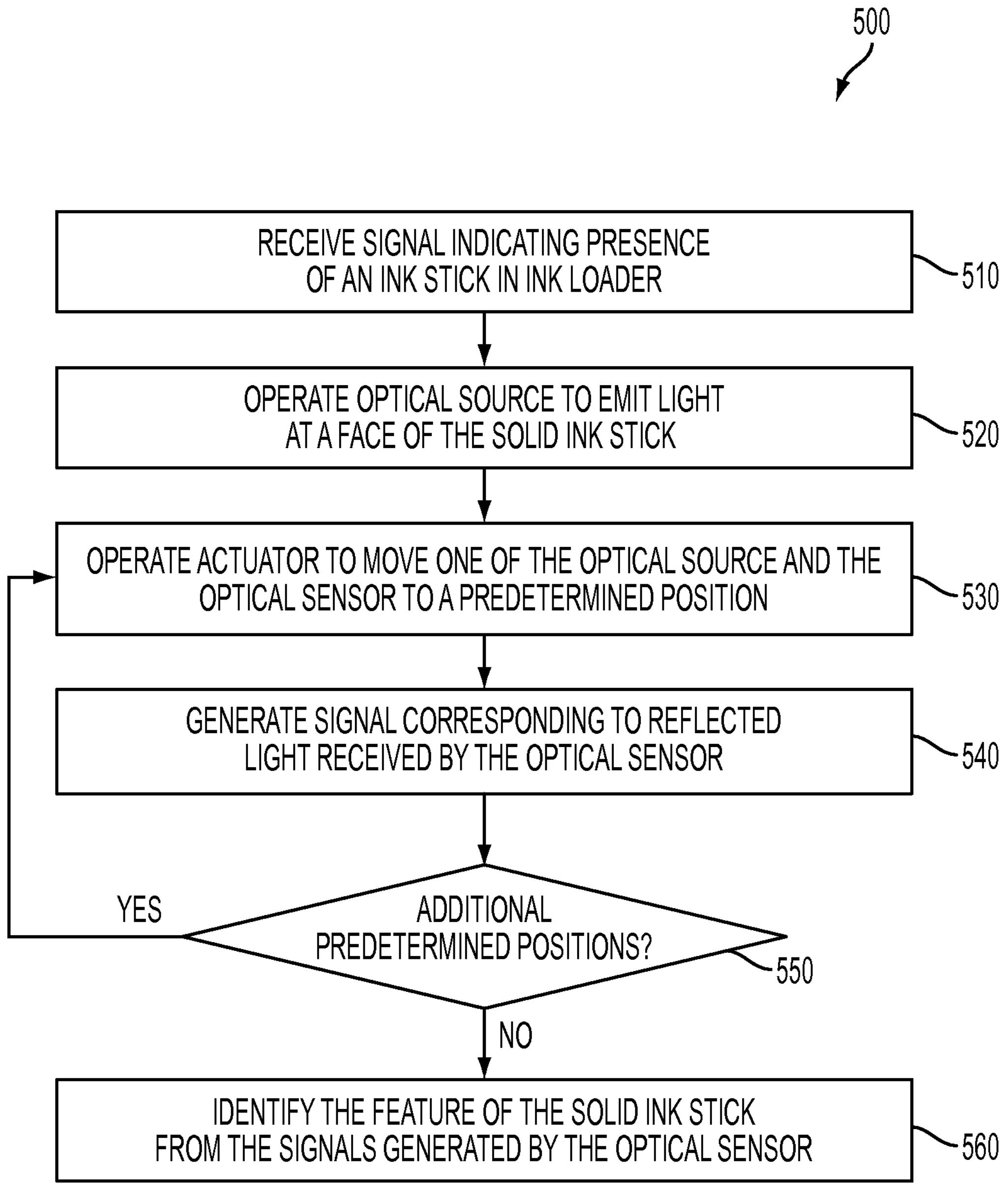
FIG. 5 is a flow diagram of a process for identifying a feature of a solid ink stick.

FIG. 5 illustrates a method 500 for identifying a solid ink stick in a solid ink printer having an ink stick identification system such as one of those described in FIG. 1-FIG. 4. In the description of the method, a statement that the process does some function or performs some action refers to a controller executing programmed instructions to do the function or perform the action or to the controller generating signals to operate one or more electrical or electromechanical components to perform the function or action.

The process begins with the controller receiving a signal indicating that an ink stick is present in the ink loader of the printer (block 510). The signal can be generated by the optical sensor of the identification system in response to receiving light reflected from the ink stick in the ink loader, or the signal can be generated by another sensor system or other mechanism configured to detect a solid ink stick in the ink loader.

Once the signal is received, the controller operates the optical source to emit light at a face of the ink stick in the ink loader (block 520). The actuator is be configured to move one of the optical sensor and the optical source between a plurality of positions. While the optical source emits light at the face of the ink stick in a continuous, pulsed or time/position fashion, the controller operates the actuator to move one of the optical source and the optical sensor to a predetermined position (block 530). Once the optical source or optical sensor is moved to the predetermined position, the optical sensor generates an electrical signal corresponding to an amount of light reflecting from the solid ink stick to the optical sensor (block 540). In some embodiments, the optical sensor can be configured to generate signals continuously while the actuator is being operated between the positions. The controller then evaluates whether the sensor or source are moved to additional predetermined positions (block 550). If there are additional predetermined positions, the process continues at block 530.

After the one of the optical source and optical sensor has been moved to all the predetermined positions, the controller evaluates the signals received from the optical sensor at the various positions of the optical source or sensor to identify the feature of the solid ink stick (block 560). The controller identifies the signal generated by the sensor corresponding to the maximum magnitude of reflected light received by the optical sensor. The controller determines the position of the one of the optical source and the optical sensor when the signal corresponding to the maximum received reflected light is received and, based on the position of the one of the optical source and the optical sensor when the maximum signal is generated, the controller identifies the feature present in the solid ink stick to identify the solid ink stick in the ink loader. The sensing operations described above can be performed for one or more than one insertion locations or feed channels, as appropriate to a particular ink loader and based on ink stick insertions. For example, a black and a yellow ink stick might be inserted at the same time in a loader with multiple insertion openings. In such a scenario, the ink stick identification process can be accomplished for one stick and then for the other or for both simultaneously.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. An ink stick detection system for a solid ink imaging device comprising:

an optical source oriented to emit light toward a first face of a solid ink stick supported in the imaging device;

an optical sensor oriented to receive light reflected from the first face of the solid ink stick and configured to generate signals corresponding to an amount of received reflected light;

an actuator operatively connected to only one of the optical source and the optical sensor, the actuator being configured to move the one of the optical source and the optical sensor between a plurality of predetermined positions; and a controller operatively connected to the actuator and the optical sensor, the controller being configured to identify a feature of the solid ink stick from the signals generated by the optical sensor.

2. The ink stick detection system of claim 1 wherein:

the actuator is operatively connected to the optical source and configured to move the optical source between the plurality of predetermined positions; and the controller is further configured to identify a peak signal generated by the optical sensor and identify the feature of the solid ink stick from a corresponding position of the optical source in response to the peak signal being generated by the optical sensor.

3. The ink stick detection system of claim 1 wherein:

the actuator is operatively connected to the optical sensor and configured to move the optical sensor between the plurality of predetermined positions; and the controller is further configured to identify a peak signal generated by the optical sensor and identify the feature of the solid ink stick from a corresponding position of the optical sensor in response to the peak signal being generated by the optical sensor.

4. The ink stick detection system of claim 1 further comprising:

an insertion opening through which the ink stick is inserted into the imaging device; and the optical source and optical sensor being oriented toward a side of the ink stick opposite the insertion opening when the ink stick is supported in the imaging device.

5. The ink stick detection system of claim 1 further comprising:

a gear drive that operatively connects the actuator to one of the optical source and the optical sensor.

6. The ink stick detection system of claim 1 further comprising:

an eccentric drive that operatively connects the actuator to one of the optical source and the optical sensor.

7. The ink stick detection system of claim 1 further comprising:

a lead screw drive that operatively connects the actuator to one of the optical source and the optical sensor.

8. The ink stick detection system of claim 1, the optical source comprising a LED.

9. The ink stick detection system of claim 1, the optical source comprising an LED laser.

10. The ink stick detection system of claim 1, the optical sensor comprising a photo transistor.

11. A method of identifying a solid ink stick comprising:

operating an optical source to emit light oriented at a first face of a solid ink stick supported in an imaging device;

operating an actuator to move only one of the optical source and an optical sensor between a plurality of positions;

generating a signal with the optical sensor corresponding to an amount of reflected light received by the optical sensor when the one of the optical source and the optical sensor is at each of the plurality of positions; and identifying a feature of the solid ink stick from the signals generated by the optical sensor at each of the plurality of positions.

12. The method of claim 11, the identification of the feature of the solid ink stick further comprising:

identifying a peak signal generated by the optical sensor; and identifying the feature of the solid ink stick from a corresponding position of the one of the optical source and the optical sensor when the peak signal is generated.

13. The method of claim 11, the operation of the actuator further comprising:

operating the actuator to move the optical source between the plurality of positions.

14. The method of claim 11, the operation of the actuator further comprising:

operating the actuator to move the optical sensor between the plurality of positions.

15. The method of claim 11, the operation of the actuator further comprising:

operating a gear drive to move the one of the optical source and the optical sensor between the plurality of positions.

16. The method of claim 11, the operation of the actuator further comprising:

operating an eccentric drive to move the one of the optical source and the optical sensor between the plurality of positions.

17. The method of claim 11, the operation of the actuator further comprising:

operating a lead screw drive to move the one of the optical source and the optical sensor between the plurality of positions.

18. The method of claim 11, the operation of the optical source further comprising:

operating a LED to emit light oriented at the first face of the solid ink stick.

19. The method of claim 11, the operation of the optical source further comprising:

operating a LED laser to emit light oriented at the first face of the solid ink stick.

20. The method of claim 11, the generation of the signal further comprising:

generating the signal with a photo transistor corresponding to the amount of reflected light received by the photo transistor.

* * * * *